(12) United States Patent
Malani et al.

(10) Patent No.: US 12,364,198 B2
(45) Date of Patent: Jul. 22, 2025

(54) CHOPPER SYSTEM WITH WEAR INDICATOR

(71) Applicant: DEERE & COMPANY, Moline, IL (US)

(72) Inventors: Yogesh V. Malani, Janephal Tehsil Mehkar (IN); Guy Burch, Thibodaux, LA (US); Todd J. Rodrigue, Thibodaux, LA (US)

(73) Assignee: Deere & Company, Moline, IL (US)

( * ) Notice: Subject to any disclaimer, the term of this patent is extended or adjusted under 35 U.S.C. 154(b) by 759 days.

(21) Appl. No.: 17/656,271

(22) Filed: Mar. 24, 2022

(65) Prior Publication Data

US 2023/0301237 A1    Sep. 28, 2023

(51) Int. Cl.
| | | |
|---|---|---|
| A01D 45/10 | (2006.01) | |
| A01F 29/06 | (2006.01) | |
| A01F 29/09 | (2010.01) | |
| A01D 43/08 | (2006.01) | |

(52) U.S. Cl.
CPC ............. *A01D 45/10* (2013.01); *A01F 29/06* (2013.01); *A01F 29/095* (2013.01); *A01D 43/08* (2013.01)

(58) Field of Classification Search
CPC ........ A01D 45/10; A01D 43/08; A01F 29/06; A01F 29/095
See application file for complete search history.

(56) References Cited

U.S. PATENT DOCUMENTS

| | | | | |
|---|---|---|---|---|
| 675,758 A | * | 6/1901 | Sherwood | B02C 18/148 |
| | | | | 241/222 |
| 3,785,223 A | * | 1/1974 | Steele | B23Q 16/065 |
| | | | | 74/818 |
| 4,065,912 A | * | 1/1978 | Quick | A01D 45/10 |
| | | | | 83/345 |
| 4,555,896 A | * | 12/1985 | Stiff | A01D 45/10 |
| | | | | 56/16.5 |

(Continued)

FOREIGN PATENT DOCUMENTS

| | | | | |
|---|---|---|---|---|
| AU | 4476199 A | * | 3/2000 | ............. A01D 45/10 |
| CN | 115568329 A | * | 1/2023 | ............. A01D 43/08 |

(Continued)

OTHER PUBLICATIONS

Image of Sugarcane Harvester Chopper Timer of EHS Manufacturing (admitted as prior art as of Jul. 30, 2021) (1 page).

*Primary Examiner* — Arpad Fabian-Kovacs

(57) ABSTRACT

A chopper system for a sugarcane harvester comprises a chopper and a wear indicator. The chopper comprises a first chopper drum, a second chopper drum, and a timer. The timer has an operational configuration in which a first timer portion and a second timer portion are operatively connected to one another to coordinate rotation of the first and second chopper drums and a timing-adjustment configuration in which the first and second timer portions are operatively disconnected from one another allowing relative movement between the first and second timer portions and corresponding relative rotation between the first and second chopper drums to adjust a timing of operation between blades of the first and second chopper drums. The wear indicator indicates an extent of blade wear of the chopper upon adjustment of the timing of operation via the timer in the timing-adjustment configuration.

15 Claims, 10 Drawing Sheets

(56) References Cited

U.S. PATENT DOCUMENTS

| | | | | |
|---|---|---|---|---|
| 5,031,392 A | * | 7/1991 | Baker | A01D 45/10 460/59 |
| 5,622,034 A | * | 4/1997 | Dommert | F16D 7/025 192/56.6 |
| 5,890,353 A | | 4/1999 | Brown | |
| 9,894,832 B2 | * | 2/2018 | Scrivner | A01D 45/10 |
| 11,950,530 B2 | * | 4/2024 | Tschirdewahn | A01D 43/08 |
| 2013/0111871 A1 | * | 5/2013 | Hinds | B02C 18/18 56/500 |
| 2015/0327437 A1 | * | 11/2015 | Mixon | A01D 45/10 241/235 |
| 2016/0223025 A1 | * | 8/2016 | Vergara | F16D 13/52 |
| 2016/0235010 A1 | * | 8/2016 | Fattepur | A01F 29/06 |
| 2018/0092306 A1 | * | 4/2018 | Burch | A01D 45/10 |
| 2018/0125005 A1 | * | 5/2018 | Lawn | A01D 45/10 |
| 2018/0235154 A1 | * | 8/2018 | Neitemeier | A01F 29/095 |
| 2020/0236857 A1 | * | 7/2020 | Gross | A01D 43/10 |
| 2021/0329834 A1 | | 10/2021 | Burch et al. | |
| 2022/0192093 A1 | * | 6/2022 | Balg | A01D 43/088 |
| 2023/0135705 A1 | * | 5/2023 | Wendte | A01D 34/006 382/104 |
| 2023/0232740 A1 | * | 7/2023 | Heitmann | A01D 43/085 460/1 |
| 2024/0292780 A1 | * | 9/2024 | Dighton | A01D 45/10 |

FOREIGN PATENT DOCUMENTS

| | | | | |
|---|---|---|---|---|
| DE | 102020000725 A1 | * | 8/2021 | A01D 43/085 |
| JP | H0367861 A | * | 3/1991 | B65H 45/18 |

\* cited by examiner

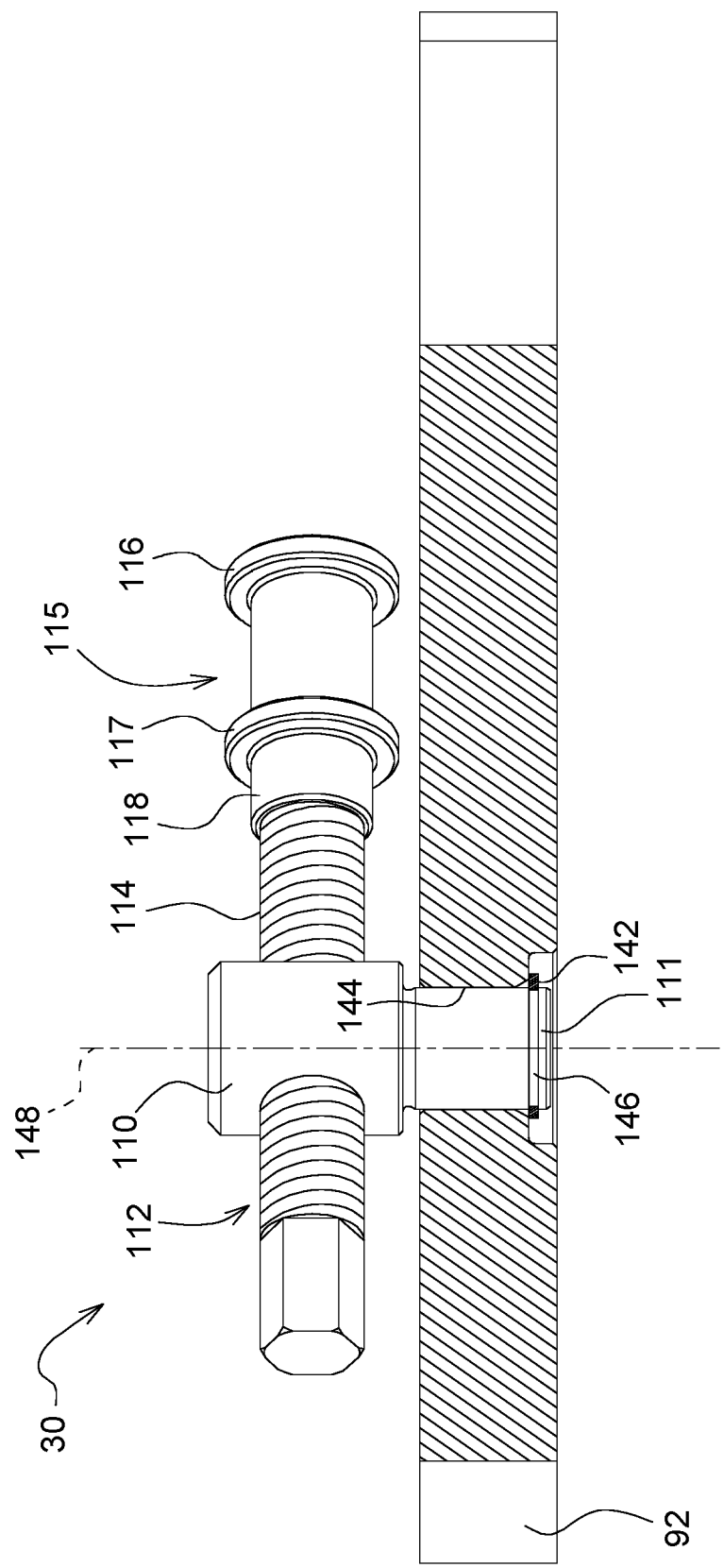

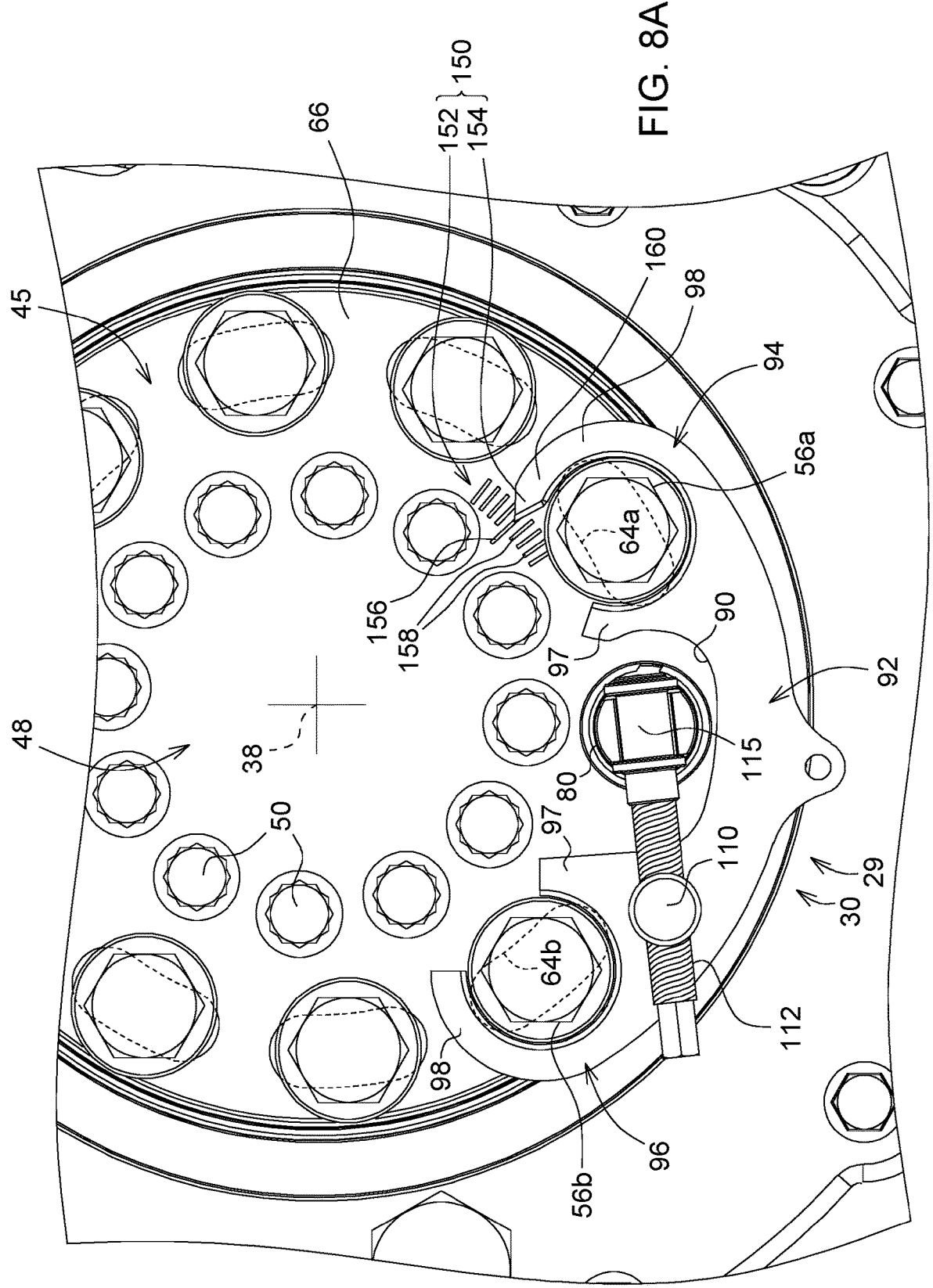

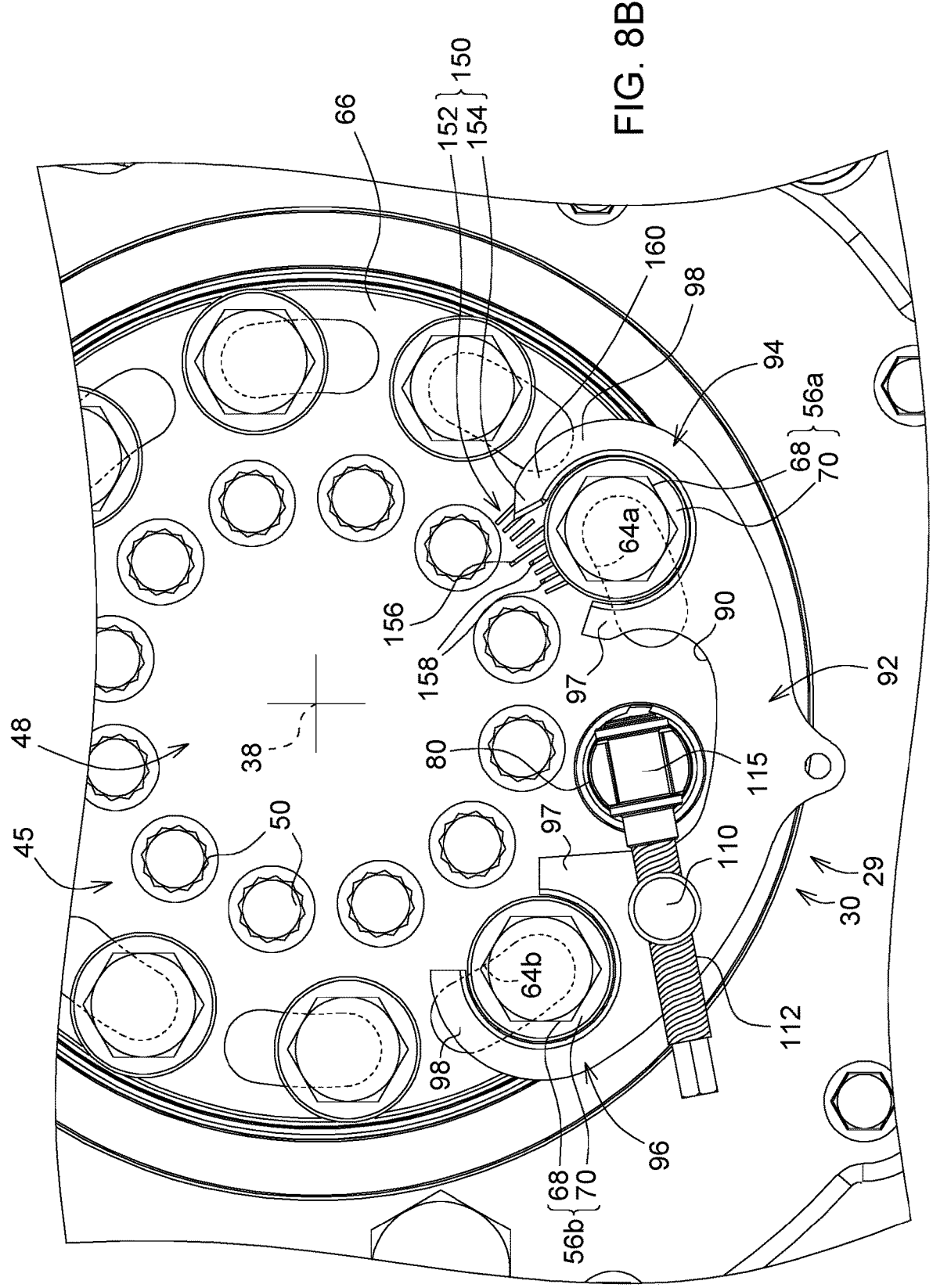

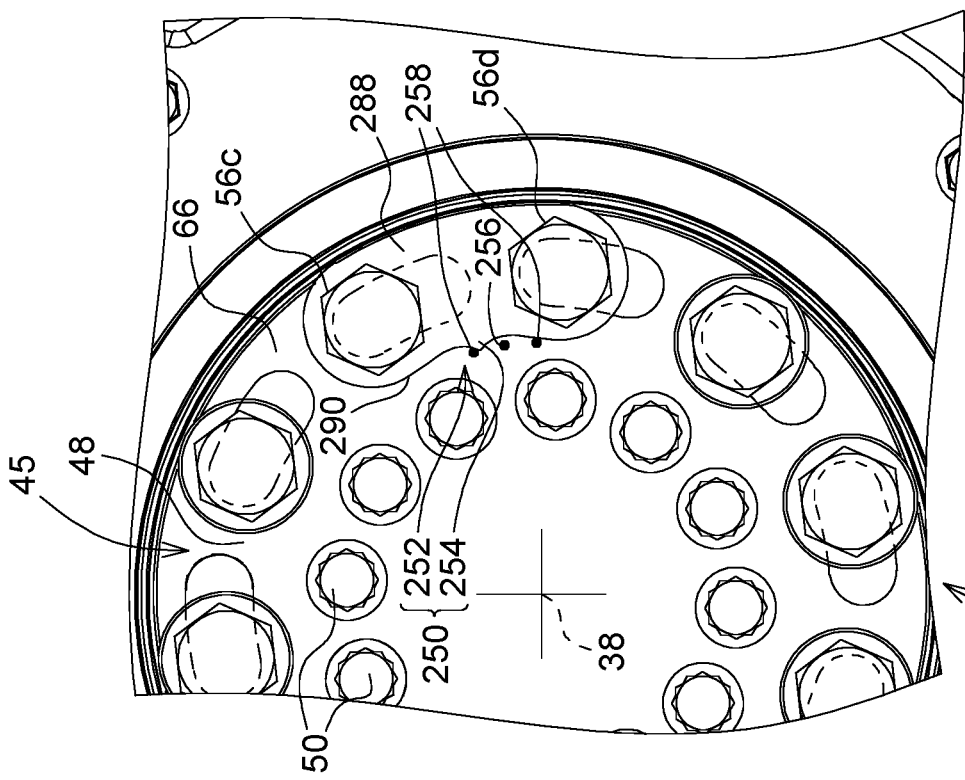
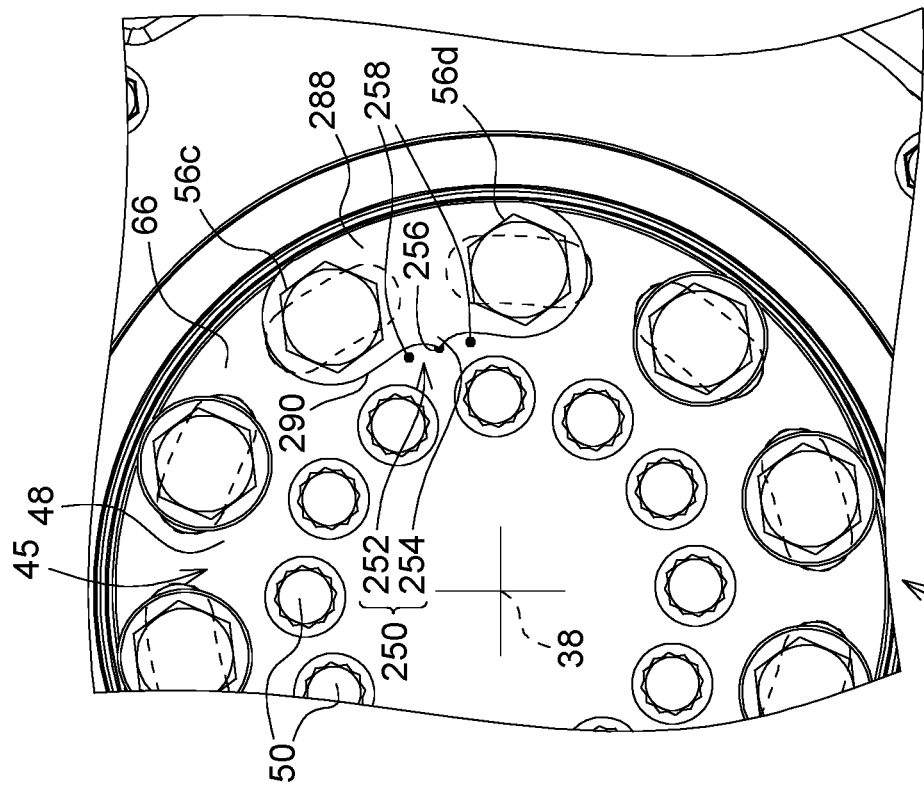

CHOPPER SYSTEM WITH WEAR INDICATOR

TECHNICAL FIELD

The present disclosure relates to extractors for sugarcane harvesters.

BACKGROUND

A sugarcane harvester typically has a chopper that severs a mat of sugarcane stalks into segments called "billets." The chopper has a first chopper drum and a second chopper drum, each with a set of blades and rotatable about a respective axis of rotation. The blades of the chopper drums cooperate to sever the stalks into billets. Blade wear can affect the timing of operation between the blades of the first chopper drum and the blades of the second chopper drum, impacting the quality of cut of the stalks.

SUMMARY

According to an aspect of the present disclosure, there is disclosed a chopper system for a sugarcane harvester. The chopper system comprises a chopper and a wear indicator. The chopper comprises a first chopper drum, a second chopper drum, and a timer. The first chopper drum is mounted for rotation about a first axis of rotation and comprises first blades positioned about a periphery of the first chopper drum. The second chopper drum is mounted for rotation about a second axis of rotation and comprises second blades positioned about a periphery of the second chopper drum such that the first chopper drum and the second chopper drum cooperate to sever sugarcane stalks into billets upon rotation of the first chopper drum and the second chopper drum respectively about the first axis of rotation and the second axis of rotation. The timer comprises a first timer portion operatively connected to the first chopper drum and a second timer portion operatively connected to the second chopper drum. The timer has an operational configuration in which the first timer portion and the second timer portion are operatively connected to one another to coordinate rotation of the first chopper drum and the second chopper drum and a timing-adjustment configuration in which the first timer portion and the second timer portion are operatively disconnected from one another allowing relative movement between the first timer portion and the second timer portion and corresponding relative rotation between the first chopper drum and the second chopper drum to adjust a timing of operation between the first blades and the second blades. The wear indicator indicates an extent of blade wear of the chopper upon adjustment of the timing of operation via the timer in the timing-adjustment configuration.

The above and other features will become apparent from the following description and accompanying drawings.

BRIEF DESCRIPTION OF THE DRAWINGS

The detailed description of the drawings refers to the accompanying figures in which:

FIG. 7 is an elevation view, partly in section along lines 7-7 of FIG. 6, with portions broken away, showing a mounting pin rotatably positioned in an aperture of the brace (in section) for rotatably mounting the boss and the adjustment bolt threaded to the boss, with a snap ring (in section) for retaining the mounting pin in the aperture;

FIG. 8A is an elevation view, with portions broken away, showing a wear indicator that indicates an extent of blade wear of the chopper, a portion of the wear indicator supported by the timing-adjustment tool, the wear indicator indicating zero blade wear associated with a fresh-blade chopper configuration FIG. 8B is an elevation view, with portions broken away, showing a wear indicator indicating blade wear associated with a worn-blade chopper configuration;

FIG. 9A is an elevation view, with portions broken away, showing a wear indicator separate from the timing-adjustment tool, the wear indicator indicating zero blade wear associated with a fresh-blade chopper configuration; and FIG. 9B is an elevation view, with portions broken away, showing the wear indicator of FIG. 9A indicating blade wear associated with a worn-blade chopper configuration.

DETAILED DESCRIPTION

Figure 1:
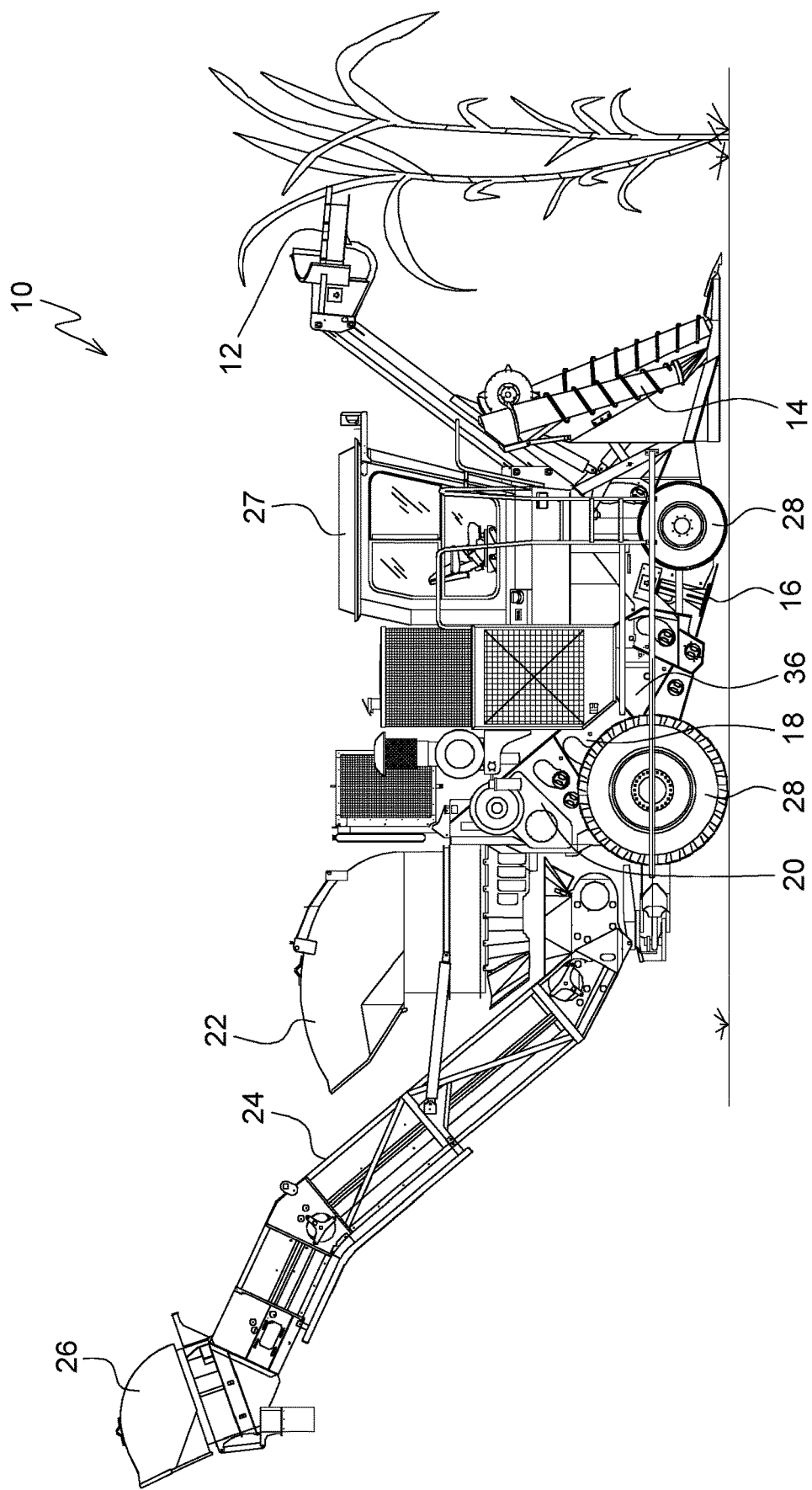
FIG. 1 is a side elevation view showing a sugarcane harvester.

Referring to FIG. 1, a sugarcane harvester 10 is configured to harvest sugarcane. The harvester 10 illustratively includes a topper 12, a left and a right crop divider scroll 14 (the left crop divider scroll 14 not shown), an upper knockdown roller and a lower knockdown roller (the knockdown rollers not shown), a basecutter assembly 16, a feeder 18, a chopper 20, a primary extractor 22, an elevator 24, and a secondary extractor 26. The topper 12 cuts off a leafy top portion of sugarcane plants. The left and right crop divider scrolls 14 lift the sugarcane plants for feeding into the throat of the harvester 10.

The basecutter assembly 16 severs sugarcane stalks knocked down forwardly by the knockdown rollers. The feeder 18 receives from the basecutter assembly 16 a mat of severed sugarcane and feeds the mat rearwardly. The chopper 20 receives the mat from the feeder 18 and cuts the sugarcane stalks into billets. The primary extractor 22 is positioned downstream from the chopper 20, separates debris, including, for example, crop residue (e.g., leafy material), from the billets, and removes the debris from the harvester 10.

The elevator 24 is positioned at the rear of the harvester 10 to receive the cleaned flow of billets, and conveys the billets to an elevated position where the billets are discharged into a wagon to be hauled away. The secondary extractor 26 is positioned near the top of the elevator 24, and further separates debris from the billets to remove the debris from the harvester 10 (some harvester embodiments may not have a secondary extractor).

The harvester 10 comprises an operator's station 27 and traction elements 28. A human operator may operate the harvester 10 from the operator's station 27. The traction elements 28 are positioned on the left and right sides of the harvester 10 to propel the harvester 10 along the ground. Each traction element 28 may be, for example, a track unit or a ground-engaging wheel (e.g., there is one track unit on each side of the harvester 10, as shown, for example, with respect to the right side in FIG. 1).

Figure 2:
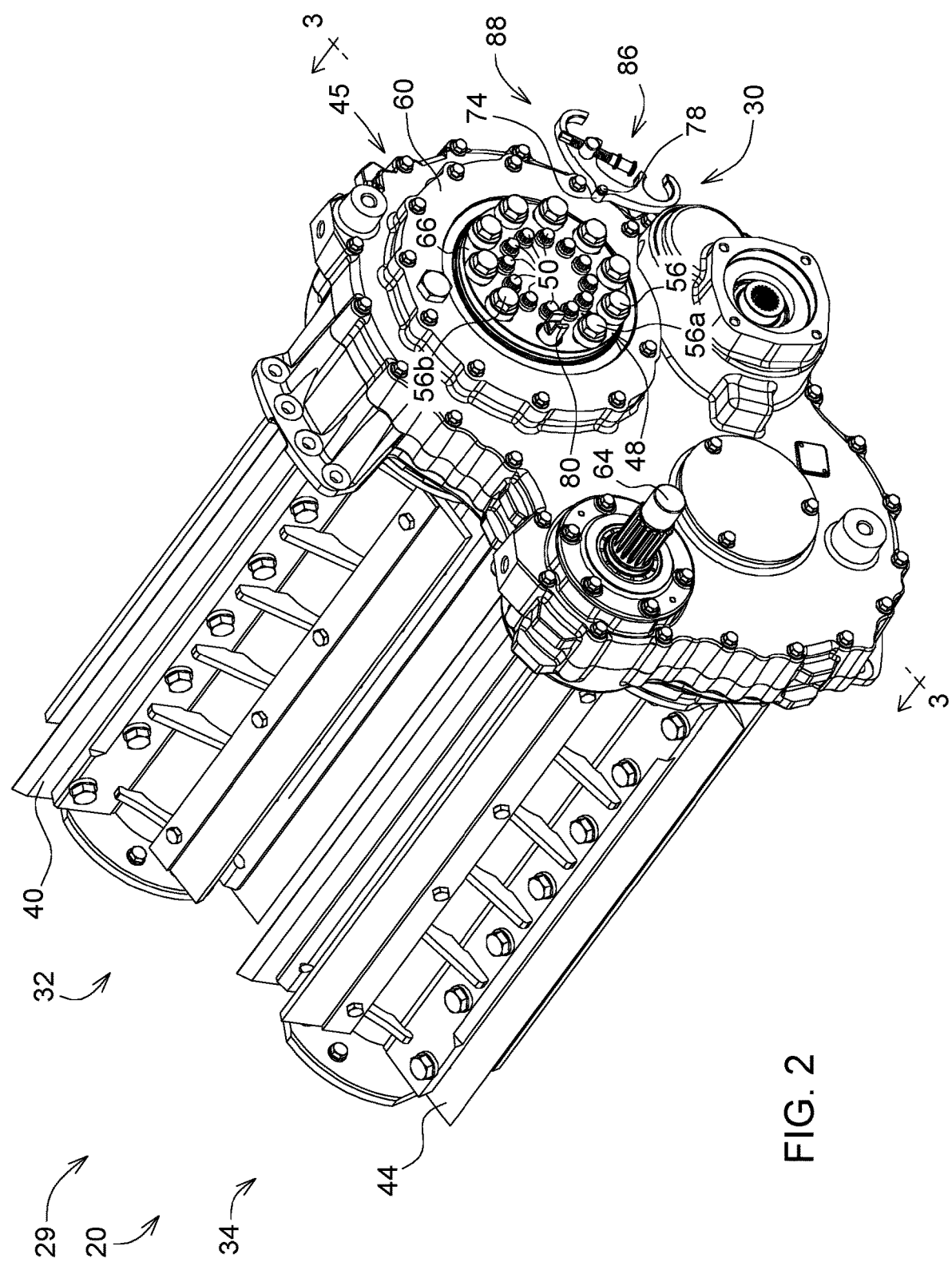
FIG. 2 is a perspective view showing a chopper of the sugarcane harvester, the chopper including a first chopper drum and a second chopper drum.
Figure 3:
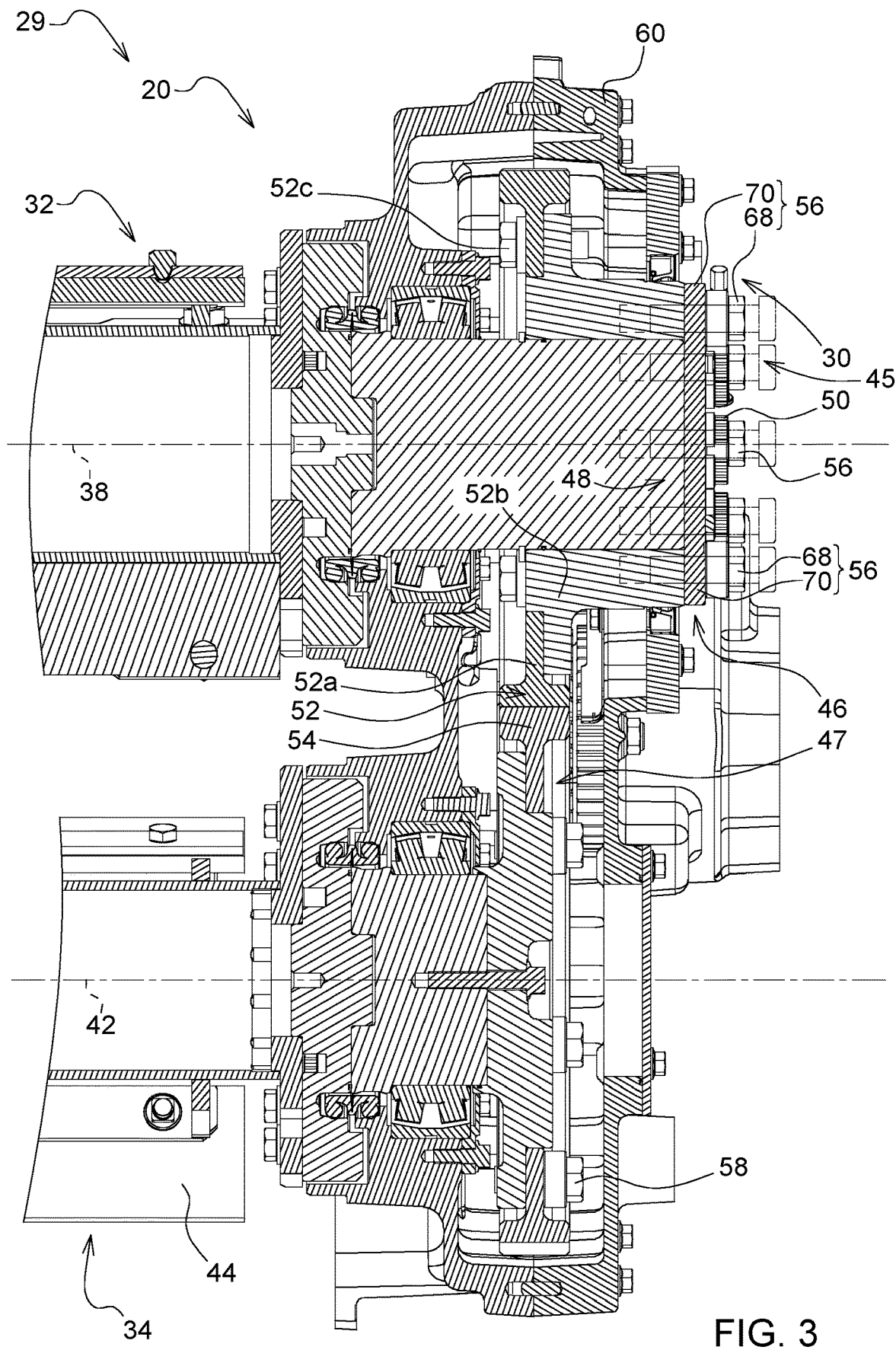
FIG. 3 is a sectional view taken along lines 3-3 of FIG. 2, with portions broken away, showing a timer that coordinates rotation of the first and second chopper drums relative to one another to establish a timing of operation between the blades of the first chopper drum and the blades of the second chopper drum, the timer having an operational configuration with a set of fasteners tightened (in solid) and a timing-adjustment configuration with the set of fasteners loosened (in phantom)

Referring to FIGS. 2 and 3, the chopper 20 is included in a chopper system 29. The chopper system 29 includes a timing-adjustment tool 30 for adjusting a timing of operation of the chopper 20 and a wear indicator 150 for indicating an extent of blade wear of the chopper 20, discussed further herein.

The chopper 20 includes counter-rotating first and second chopper drums 32, 34. The first chopper drum 32 is mounted to the frame 36 of the harvester 10 for rotation about a first axis of rotation 38. The first chopper drum 32 includes first blades 40 extending axially relative to the axis 38 and spaced about the axis 38 so as to be positioned about a periphery of the first chopper drum 32.

The second chopper drum 34 is mounted to the frame 36 for rotation about a second axis of rotation 42. The second chopper drum 34 includes second blades 44 extending axially relative to the axis 42 and spaced about the axis 42 so as to be positioned about a periphery of the second chopper drum 34. The first blades 40 of the first chopper drum 32 and the second blades 44 of the second chopper drum 34 cooperate to sever sugarcane stalks into billets upon counter-rotation of the first and second chopper drums 32, 34 respectively about the first and second axes of rotation 38, 42.

The chopper 20 includes a timer 45. The timer 45 coordinates rotation of the first and second chopper drums 32, 34 relative to one another to establish a timing of operation between the first and second chopper drums 32, 34 and the first and second blades 40, 44 thereof. When the chopper 20 is properly timed, the first and second blades 40, 44 swipe one another in a manner to sever the stalks into billets effectively, as is well known to those of ordinary skill in the art.

The blades 40, 44 may wear over time with use. The swipe and corresponding timing of operation between the blades 40 of the first chopper drum 32 and the blades 44 of the second chopper drum 34 may degrade due to such wear, reducing chopper cutting effectiveness and quality. The chopper 20 is configured to allow adjustment of the timing of operation between the chopper drums 32, 34 and their blades 40, 44 to restore the chopper and its drums 32, 34 and blades 40, 44 to a proper timing of operation.

The timer 45 includes a first timer portion 46 and a second timer portion 47. The first timer portion 46 is operatively connected to the first chopper drum 32, and the second timer portion 47 is operatively connected to the second chopper drum 34. The timer 45 has an operational configuration in which the first and second timer portions 46, 47 are operatively connected to one another to coordinate rotation of the first and second chopper drums 32, 34 and a timing-adjustment configuration in which the first and second timer portions 46, 47 are operatively disconnected from one another allowing relative movement between the first and second timer portions 46, 47 and corresponding relative rotation between the first and second chopper drums 32, 34 to adjust a timing of operation between the first blades 40 and the second blades 44. The timer 45 may be configured, for example, as a gearbox.

The chopper 20 has a fresh-blade chopper configuration and one or more worn-blade chopper configurations. In the fresh-blade chopper configuration the blades 40, 44 are fresh and the chopper drums 32, 34 are properly timed. With blade wear the chopper 20 is no longer properly timed when the chopper 20 is in the fresh-blade chopper configuration. The chopper 20 has a worn-blade chopper configuration in which one or more blades 40, 44 are worn and properly timed. The chopper 20 may have many such worn-blade chopper configurations. Typically, one or more blades of each of the first blades 40 and the second blades 44 are worn at least to some extent in a worn-blade chopper configuration. When the timer 45 is in the timing-adjustment orientation, the chopper 20 can be adjusted between its fresh-blade chopper configuration and a worn-blade chopper configuration or between worn-blade chopper configurations, as applicable.

The first timer portion 46 includes a rotor 48. The rotor 48 is connected to the first chopper drum 32 to rotate therewith about the first axis of rotation 38. An array of fasteners 50 of the first timer portion 46 fasten the rotor 48 to the first chopper drum 32 in fixed relation thereto. The fasteners 50 extend through respective apertures 51 of the rotor 48 (e.g., unthreaded circular apertures) into respective threaded apertures of the first chopper drum 32.

The second timer portion 47 includes a first gear 52, a second gear 54, and an array of fasteners 56. The fasteners 56 fasten the rotor 48 to the first gear 52 for rotation of the first gear 52 with the first chopper drum 32 about the first axis of rotation 38 when the timer 45 is in the operational configuration (fasteners 56 shown in solid in operational configuration in FIGS. 3 and 4). The second gear 54 is connected to the second chopper drum 34 to rotate therewith about the second axis of rotation 42. An array of fasteners 58 of the second timer portion 47 fasten the second gear 54 to the second chopper drum 34 in fixed relation thereto.

The first gear 52 includes, for example, an externally toothed ring 52a and a hub 52b. The ring 52a is fastened to the hub 52b with fasteners 52c. The fasteners 56 fasten the rotor 48 to the hub 52b of the first gear 52.

The first and second gears 52, 54 are rotatably connected with one another directly or indirectly. Illustratively, the first and second gears 52, 54 are in mesh with one another. For example, the ring 52a and the second gear 54 are in mesh with one another. In other embodiments, one or more other gears or other elements may interconnect the gears 52, 54.

The timer 45 includes a housing 60. The first and second gears 52, 54, are positioned in the housing 60. The rotor 48 is exposed outside the housing 60 to facilitate adjustment of the timing of operation between the first and second chopper drums 32, 34 and their blades 40, 44.

The timer 45 may include an input gear 62 and an output shaft 63. The input gear 62 may receive a rotary input that drives the chopper 20. The internally-splined input gear 62 may drive a set of gears that, in turn, drives the second gear 54. The set of gears may include a gear that is positioned on the same shaft as the input gear 62 and meshes with a larger-diameter gear on another shaft. A smaller-diameter gear may be on the same shaft as the larger-diameter gear and may mesh with the second gear 54. The second gear 54, in turn, drives the first gear 52 during operation of the chopper 20. The output shaft 63 may drive a flywheel, used to store energy that can be used in a high-torque event. The second gear 54 may mesh with a smaller-diameter gear on the output shaft 63 or otherwise fixed thereto. It is to be understood that the gearing of the timer 45, if any, may be configured in a wide variety of ways.

The rotor 48 is normally fixed to the first gear 52, but can be released for timing adjustment. The rotor 48 is normally fastened to the first gear 52 with the fasteners 56 in fixed relation to the first gear 52, as shown, for example, with fasteners 56 in solid in FIGS. 3 and 4. The rotor 48 is so fixed in the operational configuration of the timer 45 during, for example, use of the chopper 20 to sever stalks into billets. To adjust timing, the timer 45 is changed to the timing-adjustment configuration. The fasteners 56 are loosened for relative rotation between the rotor 48 and the first gear 52 when the timer 45 is in the timing-adjustment configuration, as shown, for example, with fasteners 56 in phantom in FIG. 3. Upon loosening of the fasteners 56, the rotor 48 can be rotated relative to the first gear 52. Such rotation of the rotor 48 causes the first chopper drum 32 and its blades 40 to rotate about the first axis 38 relative to the second chopper drum 34 and its blades 44. For example, upon blade wear the first chopper drum 32 can be rotated about the first axis 38 relative to the second chopper drum 34 from a first chopper configuration (e.g., the fresh-blade chopper configuration or a first worn-blade chopper configuration) to a second chopper configuration (e.g., a second worn-blade chopper configuration) to re-establish proper timing between the chopper drums 32, 34 and their blades 40, 44.

To enable rotation of the rotor 48 relative to the first gear 52, the fasteners 56 can, for example, be partially withdrawn from the first gear 52 such that the rotor 48 is no longer fixed to the first gear 52 but rotatable relative thereto. The rotor 48 includes a disk 66, and the disk 66 comprises an array of slots 64 formed in the disk 66. The pattern of the slots 64 matches the pattern of the fasteners 56, such that the fasteners 56 extend respectively through the slots 64, allowing relative movement between the fasteners 56 and the slots 64 when the timer 45 is in the timing-adjustment configuration. Upon loosening of the fasteners 56 relative to the disk 66, the rotor 48 and its slots 64 can rotate about the axis 48 relative to the fasteners 56 extending respectively through the slots 56. The slots 64 are arcuate to facilitate such rotation of the rotor 48 and slots 64.

Each fastener 56 includes a bolt 68 and a spacer 70. The bolt 68 extends through the spacer 70 and the respective slot 64 into threaded engagement with the first gear 52. The shank of the bolt 68 is threaded tightly to the corresponding threaded aperture of the first gear 52 so as to capture the spacer 70 between and against the head of the bolt 68 and the disk 66 of the rotor 48 in frictional engagement with the head and the disk 66, to thereby fix the rotor 48 to the first gear 52. Loosening the bolts 68 releases the spacers 70 so that the rotor 48 can be rotated for timing adjustment.

Figure 4:
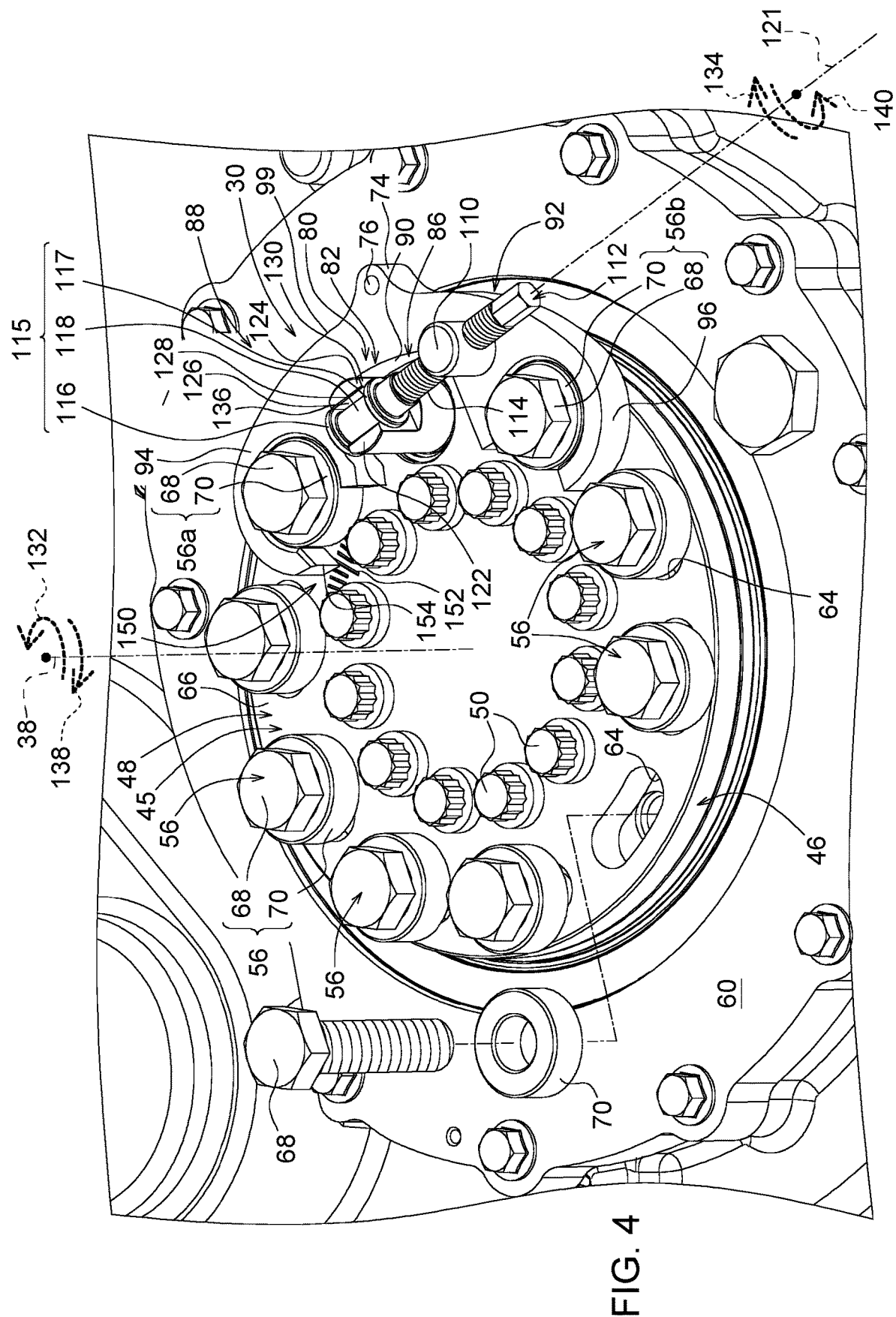
FIG. 4 is a perspective view showing a timing-adjustment tool that adjusts the timing of operation between the blades of the first chopper drum and the blades of the second chopper drum.

Referring to FIGS. 2-4, a person can use the timing-adjustment tool 30 to adjust the timing of operation between the chopper drums 32, 34 and the blades 40, 44 thereof. The tool 30 can be stored in a storage position in an accessible location, such as, for example, on the housing 60. The tool 30 includes an attachment point 74 adapted to connect to the housing 60. The attachment point 74 includes an aperture 76 through which a fastener 78 (e.g., threaded bolt) extends into the housing 60 to mount the tool 30 to the housing 60.

Referring to FIG. 4, in a use position the timing-adjustment tool 30 removably connects to the first timer portion 46 and the second timer portion 47 to adjust a timing of operation between the first and second chopper drums 32, 34 and the blades 40, 44. The tool 30 removably mounts to a first fastener 56a of the fasteners 56, a second fastener 56b of the fasteners 56, and the rotor 48 to rotate the rotor 48 relative to the first gear 52 to adjust the timing of operation between the first blades 40 and the second blades 44 when the fasteners 56 are loosened. The first fastener 56a extends through a first slot 64a of the slots 64, and the second fastener 56b extends through a second slot 64b of the slots 64. The tool 30 may be so mounted by a person to adjust the timing.

The rotor 48 includes an anchor 80. The anchor 80 is positioned between the first and second fasteners 56a, 56b and is fixed to the disk 66.

Figure 5:
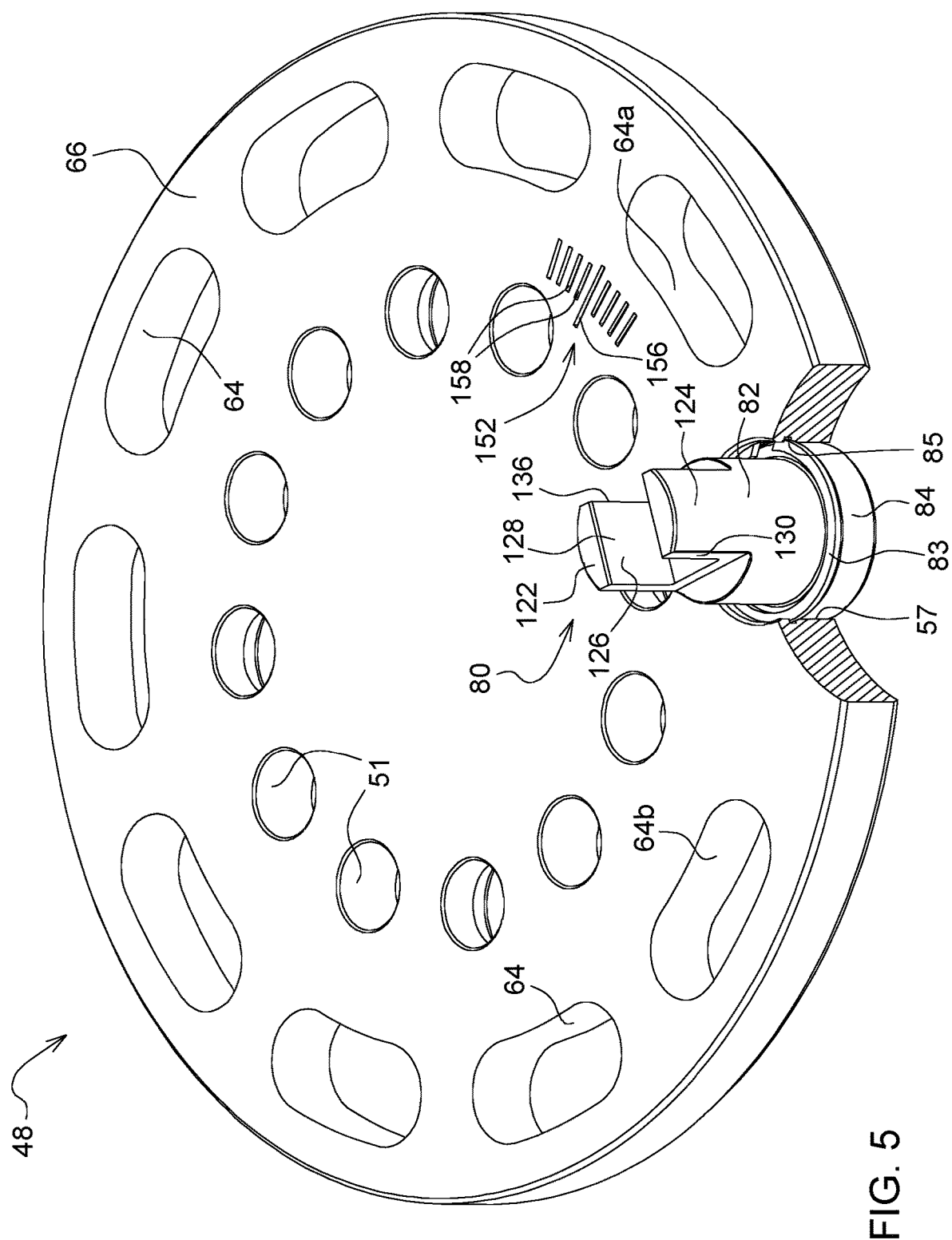
FIG. 5 is a perspective view, with portions broken away, showing a rotor of the timer.

Referring to FIG. 5, the anchor 80 includes a tower 82, a snap ring 83, and a base 84. The base 84 is positioned in an aperture 57 of the disk 66 (e.g., circular aperture), and is wider in diameter than the tower 82 so as to include a neckdown portion in the form of an annular shoulder that contacts the snap ring 83. The base 84 is captured between the snap ring 83, positioned in a groove 85 of the aperture 57, and the first gear 52. The tower 82 extends axially from the base 84 away from the disk 66 relative to the axis 38. The tower 82 and the base 84 are constructed as a single-piece construction. In other embodiments, the tower 82 and the base 84 may be configured as separate components.

Referring back to FIG. 4, the tool 30 is supported on the first fastener 56a and the second fastener 56b and is operatively connected to the anchor 80. The tool 30 includes an adjuster 86 that connects to the anchor 80 and an adjuster support 88 that mounts to the first fastener 56a and the second fastener 56b and supports the adjuster 86. The adjuster support 88 includes a pocket 90 in which the anchor 80 is positioned when the adjuster support 88 is mounted to the first and second fasteners 56a, 56b.

The adjuster support 88 includes a brace 92. The brace 92 connects to the first fastener 56a and the second fastener 56b such that the brace 92 engages the first fastener 56a and the second fastener 56b and defines the pocket 90 in which the anchor 80 is positioned.

The brace 92 includes a first engagement portion 94, a second engagement portion 94, and a body 99 interconnecting the first engagement portion 94 and the second engagement portion 96. The first engagement portion 94 cups or otherwise connects to the first fastener 56a, and the second engagement portion 94 cups or otherwise connects to the second fastener 56b. The first engagement portion 94 is configured, for example, as a first hand that cups the first fastener 56a and comprises a thumb 97 and a finger 98 which cooperate to so cup the first fastener 56a, and the second engagement portion 96 is configured, for example, as a second hand that cups the second fastener 56b, is spaced apart from the first hand to define the pocket 90 in which the anchor 80 is positioned, and comprises a thumb 97 and a finger 98 which cooperate to so cup the second fastener 56b. The thumbs 97 are positioned between the fingers 98 with the anchor 80 positioned in the pocket 90 defined between the thumbs 97.

The brace 92 engages the spacers 70 of the first and second fasteners 56a, 56b. The first engagement portion 94 cups the spacer 70 of the first fastener 56a, and the second engagement portion 96 cups the spacer 70 of the second fastener 56b. The engagement portions 94, 96 may extend more or less about the respective spacers 70. As such, illustratively, the engagement portions 94, 96 may be open. In other embodiments, the engagement portions 94, 96 may forms a closed loop respectively around the fasteners 56a, 56b.

Figure 6:
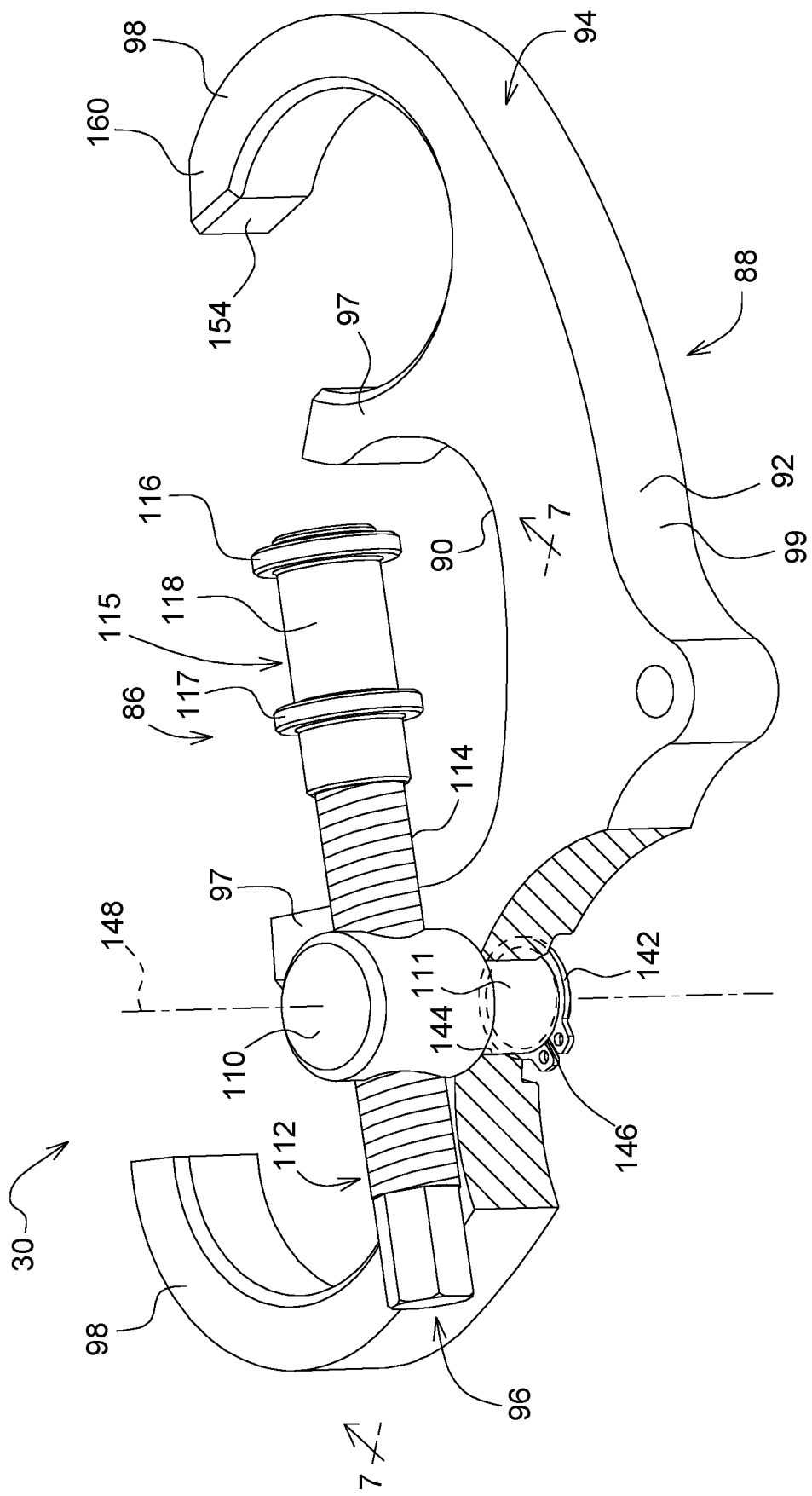
FIG. 6 is a perspective view of the timing-adjustment tool, with portions broken away, showing an adjustment bolt supported by a threaded boss, and showing rotatable mounting of the boss to a brace of the tool.

Referring to FIGS. 4 and 6-7, the adjuster support 88 includes an internally threaded boss 110. The boss 110 is connected to the brace 92 such that the boss 110 projects from the brace 92 axially relative to the axis 38. The boss 110 projects away from the body 99 of the brace 92 from a location in proximity to the first engagement portion 94.

The threaded boss 110 is rotatably connected to the brace 92 with, for example, a mounting pin 111 and a snap ring 142. The mounting pin 111 is smaller in diameter than the boss 110 and is positioned in an aperture 144 of the brace 92. The snap ring 142 blocks removal of the pin 111 from the aperture 144.

In the illustrated embodiment, the aperture 144 extends through the brace 92, and the pin 111 extends from the boss 110 through the aperture 144. The pin 111 has an annular groove 146 in which the snap ring 142 is positioned and mounted to the pin 111 to block removal of the pin 111 from the aperture 144. The boss 110 blocks removal of the pin 111 from the aperture 114 at the other end. The boss 110 is able to rotate about an axis 148 of the boss 110 and pin 111. The threaded boss 110 and the mounting pin 111 are integrated with one another so as to provide a one-piece construction. In other embodiments, the boss 110 and the pin 111 may be distinct pieces that are coupled to one another.

Referring to FIG. 4, the adjuster 86 includes an adjustment bolt 112 that operatively connects to the anchor 80. The adjustment bolt 112 is operatively connected to the anchor 80 to rotate the rotor 48 in response to rotation of the adjustment bolt 112 when the tool 30 is in its use position mounted to the fasteners 56a, 56b.

The adjustment bolt 112 is operatively connected to the anchor 80 and supported by the brace 92. The adjustment bolt 112 is mounted to the boss 110. A shank 114 is threaded to and extends through the boss 110.

The adjuster 86 includes a pressure applicator 115 that engages with the anchor 80. The pressure applicator 115 includes an annular first flange 116, an annular second flange 117, and an internally threaded sleeve 118. The sleeve 118 is threaded to the shank 114 of the adjustment bolt 112. The first and second flanges 116, 117 are mounted to the sleeve 118 so as to surround and extend radially outwardly from the sleeve 118, and are positioned in spaced-apart relation to one another lengthwise of the sleeve 118. The applicator 115 is somewhat spool-shaped.

The first and second flanges 116, 117 interface with the anchor 80 to rotate the first and second slots 64a, 64b respectively relative to the first and second fasteners 56a, 56b to rotate the rotor 48 relative to the first gear 52 in response to rotation of the adjustment bolt 112 about its own axis 121. The flanges 116, 117 interface with the tower 82 to so rotate the first and second slots 64a, 64b. The tower 82 is positioned between the first and second flanges 116, 117 so as to be captured therebetween. The tower 82 includes a first lug 122 and a second lug 124. The first and second lugs 122, 124 cooperate to define a gap 126 therebetween to receive the shank 114 and sleeve 118 threaded thereto and an opening 128 into the gap 126 for passage of the shank 114 and the sleeve 118 through the opening 128 into and out of the gap 126 during assembly and disassembly of the tool 30 to and from the first and second fasteners 56a, 56b. During assembly, the boss 110 can be rotated about the axis 148 of the boss 110 and mounting pin 111 as needed to align the adjustment bolt 112 with the opening 128 and the gap 126 of the tower 82.

The flanges 116, 117 apply pressure to the tower 82 to rotate the rotor 48 in response to rotation of the adjustment bolt 112. The first flange 116 is adapted to press against a first side 130 of the first and second lugs 122, 124 to rotate the rotor 48 in a first direction 132 about the first axis of rotation 38. The first flange 116 presses against the first side 130 of the lugs 122, 124 to so rotate the rotor 48 in response to rotation of the adjustment bolt 112 in a first direction 134 about the bolt axis 121. The second flange 117 is adapted to press against a second side 136 of the first and second lugs 122, 124 opposite to the first side 130 to rotate the rotor 48 in a second direction 138 about the axis 38 opposite to the first direction 132. The second flange 117 presses against the second side 136 of the lugs 122, 124 to so rotate the rotor 48 in response to rotation of the adjustment bolt 112 in a second direction 140 about the bolt axis 121.

During use of the chopper 20, the tool 30 can be stored in its storage position on the housing 60. The adjuster support 88 includes the attachment point 74. The attachment point 74 projects from the body 99 and is connected to the housing 60 with the fastener 78. The attachment point 74 may be configured as a tab integrated with the body 99 and including the aperture 76 for the fastener 78.

The tool 30 can be released from its storage position when it is desired to adjust the chopper timing. A person can remove the fastener 78 from the housing 60 to free the tool 30 from the housing 60.

The tool 30 can then be mounted in its use position. A person orients the tool 30 in register with the first and second fasteners 56a, 56b and the tower 82 before mounting the tool 30 thereto. The engagement portions 94, 96 are oriented respectively relative to the first and second fasteners 56a, 56b, and the adjustment bolt 112 and the flanges 116, 117 are oriented relative to the tower 82. The boss 110 can be rotated about the axis 148 to facilitate alignment of the adjustment bolt 112 and flanges 116, 118 relative to the tower 82. The tool 30 is then positioned in its use position, with the first and second fasteners 56a, 56b received respectively by the engagement portions 94, 96 and the shank 114 of the adjustment bolt 112 and the sleeve 118 received through the opening 128 into the gap 126 such that the flanges 116, 117 are positioned on opposite sides 130, 136 of the lugs 122, 124. The adjustment bolt 112 can then be rotated in the first or second direction 134, 140 about the bolt axis 121 as desired to rotate the rotor 48 and the first chopper drum 32 fixed thereto in the corresponding first or second direction 132, 138 about the axis of rotation 38 to adjust the timing between the blades 40 of the first chopper drum 32 and the blades 44 of the second chopper drum 34. The boss 110 is rotatably mounted to the brace 92 via the pin 111 to enable rotation of the adjustment bolt 112 about the axis 148 of the boss 110 and pin 111 in response rotation of the rotor 48 about the axis 38 of the first chopper drum 32. The tool 30 enables fine tuning adjustment to timing. Because the tool 30 is external to the chopper 20, damage to the tool 30 in high-load events is avoided.

In a second embodiment of the timing-adjustment tool, the tool has a single engagement portion, rather two engagement portions. As such, the adjuster support is modified from the adjuster support 88, while the adjuster is similar to the adjuster 86. The boss of the adjuster support is connected to the engagement portion, for threaded mounting of the adjustment bolt to the boss.

The single engagement portion engages the fastener 56a, such as, for example, the spacer 70 of the fastener 56a. The engagement portion may extend more or less about the spacer 70. For example, the engagement portion is configured as a hand that cups the spacer 70, without encircling the fastener 56a. In another embodiment, the engagement portion surrounds the fastener 56a so as to encircle the fastener 56a and the spacer 70 thereof. In such a case, rotation of the adjustment bolt 112 in the directions 134, 140 about the bolt axis 121 causes respectively the flanges 116, 117 to move the tower 82, and thus the rotor 48, in the directions 132, 138 about the first axis of rotation 38.

Referring to FIGS. 4, 8A, and 8B, the chopper system 29 includes a wear indicator 150. The wear indicator 150 indicates an extent of blade wear of the chopper 20 upon adjustment of the timing of operation via the timer 45 in the timing-adjustment configuration.

The wear indicator 150 includes a first indicator portion 152 and a second indicator portion 154. The first indicator portion 152 is connected to and supported by the first timer portion 46. Illustratively, the first indicator portion 152 is supported by the disk 66.

The second indicator portion 154 is supported by the timing-adjustment tool 30. When the tool 30 is positioned in its use position, the second indicator portion 154 is connected to the second timer portion 47 for relative movement between the first and second indicator portions 152, 154 in response to relative movement between the first and second timer portions 46, 47 when the timer 45 is positioned in the timing-adjustment configuration.

The adjuster support 88 supports the second indicator portion 154. For example, the brace 92 supports the second indicator portion 154. Illustratively, the first engagement portion 94, configured, for example, as a hand, supports the second indicator portion 154. The second indicator portion 154 is integrated with the first engagement portion 94 as a one-piece construction. In other embodiments, the first engagement portion 94 and the second indicator portion 154 may be distinct pieces coupled to one another.

In the illustrated embodiment, the first indicator portion 152 is configured, for example, as a scale, and the second indicator portion 154 is configured, for example, as a pointer that points at the scale. In other embodiments, the first indicator portion 152 may be configured as the pointer, and the second indicator portion 154 may be configured as the scale.

In the illustrated embodiment, the scale is formed in or otherwise positioned on the disk 66, and includes a series of marks at regular intervals. The series of marks may be configured in a wide variety of ways. For example, the series of marks includes a central, larger mark 156 (e.g., larger line) and a number of side, smaller marks 158 (e.g., smaller lines) on either side of the larger mark 156. The larger mark 156 is indicative of a fresh-blade chopper configuration of the chopper 20 in which the first and second blades 40, 44 are fresh. Each smaller mark 158 is indicative of the extent of blade wear of the chopper 20 relative to the fresh-blade chopper configuration. As such, each smaller mark 158 is indicative of a worn-blade chopper configuration of the chopper 20, having one or more worn blades 40, 44, relative to the fresh-blade chopper configuration. A greater distance of a smaller mark 158 from the larger mark 156 indicates greater blade wear.

The illustrated pointer is integrated with, or otherwise supported by, the hand embodying the first engagement portion 94. The pointer is integrated with, or otherwise supported by, the finger 98 of that hand, or a tip 160.

Referring to FIGS. 9A and 9B, in another embodiment, the chopper system 29 includes a wear indicator 250 instead of the wear indicator 150. The wear indicator 250 indicates an extent of blade wear of the chopper 20 upon adjustment of the timing of operation via the timer 45 in the timing-adjustment configuration. The wear indicator 250 is distinct from the timing-adjustment tool 30.

The wear indicator 250 includes a first indicator portion 252 and a second indicator portion 254. The first indicator portion 252 is connected to and supported by the first timer portion 46. Illustratively, the first indicator portion 152 is supported by the disk 66.

The second indicator portion 254 is supported by a support 288 distinct from the timing-adjustment tool 30. The support 288 is connected to the second timer portion 47 such that the second indicator portion 254 is connected to the second timer portion 47 for relative movement between the first and second indicator portions 252, 254 in response to relative movement between the first and second timer portions 46, 47 when the timer 45 is positioned in the timing-adjustment configuration.

The support 288 mounts to a third fastener 56c of the fasteners 56 and a fourth fastener 56d of the fasteners 56. The third fastener 56c extends through a third slot 64c of the slots 64, and the fourth fastener 56d extends through a fourth slot 64d of the slots 64. The support 288 is configured, for example, as a plate sandwiched between the heads of the bolts 68 of the fasteners 56c, 56d and the spacers 70 of the fasteners 56c, 56d. When the fasteners 56 are loosened, including fasteners 56c, 56d, to allow relative rotation between the first and second timer portions 46, 47, the support 288 can remain mounted to the fasteners 56c, 56d.

In the illustrated embodiment, the first indicator portion 252 is configured, for example, as a scale, and the second indicator portion 254 is configured, for example, as a pointer that points at the scale. In other embodiments, the first indicator portion 252 may be configured as the pointer, and the second indicator portion 254 may be configured as the scale.

In the illustrated embodiment, the scale is formed in or otherwise positioned on the disk 66, and includes a series of marks at regular intervals. The series of marks may be configured in a wide variety of ways. For example, the series of marks includes a central mark 256 (e.g., central dot or dimple) and a number of side marks 258 (e.g., dots or dimples) on either side of the central mark 256. The central mark 256 is indicative of a fresh-blade chopper configuration of the chopper 20 in which the first and second blades 40, 44 are fresh. Each side mark 258 is indicative of the extent of blade wear of the chopper 20 relative to the fresh-blade chopper configuration. As such, each side mark 258 is indicative of a worn-blade chopper configuration of the chopper 20, having one or more worn blades 40, 44, relative to the fresh-blade chopper configuration. A greater distance of a side mark 258 from the central mark 256 indicates greater blade wear.

The pointer is integrated with, or otherwise supported by, the support 288. For example, the pointer is integrated with the support 288, and formed along a radially inner edge 290 of the support 288 relative to the first axis of rotation 38.

It is to be understood that, although threads are not shown in the drawings for ease of illustration (except for the adjustment bolt 112 in FIGS. 6 and 7 where threads are shown diagrammatically), the chopper system 29 would include threads in connection with various components, such as, for example, fasteners 50, 56, 58, 78, adjustment bolt 112, and sleeve 118 and corresponding portions to which they are threaded. It is to be understood that the hatching in the drawings is general in nature, rather than material-specific.

While the above describes example embodiments of the present disclosure, these descriptions should not be viewed in a limiting sense. Rather, other variations and modifications can be made without departing from the scope and spirit of the present disclosure as defined in the appended claims.

What is claimed is:

1. A chopper system for a sugarcane harvester, comprising:
   a chopper comprising:
   a first chopper drum mounted for rotation about a first axis of rotation and comprising first blades positioned about a periphery of the first chopper drum,
   a second chopper drum mounted for rotation about a second axis of rotation and comprising second blades positioned about a periphery of the second chopper drum such that the first chopper drum and the second chopper drum cooperate to sever sugarcane stalks into billets upon rotation of the first chopper drum and the second chopper drum respectively about the first axis of rotation and the second axis of rotation,
   a timer comprising a first timer portion operatively connected to the first chopper drum and a second timer portion operatively connected to the second chopper drum, wherein the timer has an operational configuration in which the first timer portion and the second timer portion are operatively connected to one another to coordinate rotation of the first chopper drum and the second chopper drum and a timing-adjustment configuration in which the first timer portion and the second timer portion are operatively disconnected from one another allowing relative movement between the first timer portion and the second timer portion and corresponding relative rotation between the first chopper drum and the second chopper drum to adjust a timing of operation between the first blades and the second blades, and
   a wear indicator that indicates an extent of blade wear of the chopper upon adjustment of the timing of operation via the timer in the timing-adjustment configuration.

2. The chopper system of claim 1, wherein the wear indicator comprises a first indicator portion connected to the first timer portion and a second indicator portion connected to the second timer portion for relative movement between the first and second indicator portions in response to relative movement between the first and second timer portions when the timer is positioned in the timing-adjustment configuration.

3. The chopper system of claim 2, wherein the first indicator portion comprises a scale, and the second indicator portion comprises a pointer that points at the scale.

4. The chopper system of claim 2, comprising a support, wherein the second timer portion comprises a first fastener and a second fastener, and the support mounts to the first fastener and the second fastener and supports the second indicator portion.

5. The chopper system of claim 1, comprising a timing-adjustment tool, wherein the wear indicator comprises a portion supported by the timing-adjustment tool.

6. A sugarcane harvester comprising the chopper system of claim 1.

7. A chopper system for a sugarcane harvester, comprising;
   a chopper comprising:
   a first chopper drum mounted for rotation about a first axis of rotation and comprising first blades positioned about a Periphery of the first chopper drum;
   a second chopper drum mounted for rotation about a second axis of rotation and comprising second blades positioned about a Periphery of the second chopper drum such that the first chopper drum and the second chopper drum cooperate to sever sugarcane stalks into billets upon rotation of the first chopper drum and the second chopper drum respectively about the first axis of rotation and the second axis of rotation;
   a timer comprising a first timer Portion operatively connected to the first chopper drum and a second timer Portion operatively connected to the second chopper drum, wherein the timer has an operational configuration in which the first timer portion and the second timer portion are operatively connected to one another to coordinate rotation of the first chopper drum and the second chopper drum and a timing-adjustment configuration in which the first timer portion and the second timer portion are operatively disconnected from one another allowing relative movement between the first timer portion and the second timer portion and corresponding relative rotation between the first chopper drum and the second chopper drum to adjust a timing of operation between the first blades and the second blades;
   a wear indicator that indicates an extent of blade wear of the chopper upon adjustment of the timing of operation via the timer in the timing-adjustment configuration; and
   a timing-adjustment tool that removably connects to the first timer portion and the second timer portion to adjust a timing of operation between the first and second chopper drums, wherein the wear indicator comprises a first indicator portion supported by the first timer portion and a second indicator portion supported by the timing-adjustment tool.

8. The chopper system of claim 7, wherein the second timer portion comprises a fastener, the timing-adjustment tool comprises a hand that cups the fastener, and the hand supports the second indicator portion.

9. The chopper system of claim 8, wherein the hand comprises a finger, the first indicator portion comprises a scale, and the second indicator portion comprises a pointer that is integrated with the finger and points at the scale.

10. The chopper system of claim 7, wherein the first timer portion comprises a rotor connected to the first chopper drum to rotate therewith, the second timer portion comprises a first gear, fasteners fastening the rotor to the first gear for rotation of the first gear with the first chopper drum when the timer is in the operational configuration, and a second gear connected to the second chopper drum to rotate therewith, the first and second gears rotatably connected to one another, the fasteners loosened for relative rotation between the rotor and the first gear when the timer is in the timing-adjustment configuration, the timing-adjustment tool comprises a brace that connects to a first fastener of the fasteners and a second fastener of the fasteners, and the second indicator portion is supported by the brace.

11. The chopper system of claim 10, wherein the brace comprises a first engagement portion that connects to the first fastener and a second engagement portion that connects to the second fastener, and the second indicator portion is integrated with the first engagement portion.

12. The chopper system of claim 10, wherein the rotor comprises a disk and an anchor fixed to the disk, the disk comprises slots through which the fasteners respectively extend allowing relative movement between the fasteners and the slots when the timer is in the timing-adjustment configuration, the timing-adjustment tool comprises an adjustment bolt connected to the anchor and supported by the brace, the brace comprises a first hand that cups the first fastener and a second hand that cups the second fastener and is spaced apart from the first hand to define a pocket in which the anchor is positioned, the first indicator portion is supported by the disk, and the second indicator portion comprises a pointer integrated with the first hand.

13. The chopper system of claim 12, wherein each of the first hand and the second hand comprises a thumb and a finger which cooperate to cup the respective first fastener or second fastener, the thumbs are positioned between the fingers with the anchor positioned in the pocket defined between the thumbs, the first indicator portion comprises a scale on the disk, and the pointer is integrated with a tip of the finger of the first hand and points at the scale.

14. A chopper system for a sugarcane harvester, comprising:
  a chopper comprising:
  a first chopper drum mounted for rotation about a first axis of rotation and comprising first blades positioned about a periphery of the first chopper drum;
  a second chopper drum mounted for rotation about a second axis of rotation and comprising second blades positioned about a periphery of the second chopper drum such that the first chopper drum and the second chopper drum cooperate to sever suqarcane stalks into billets upon rotation of the first chopper drum and the second chopper drum respectively about the first axis of rotation and the second axis of rotation;
  a timer comprising a first timer Portion operatively connected to the first chopper drum and a second timer Portion operatively connected to the second chopper drum, wherein the timer has an operational configuration in which the first timer portion and the second timer portion are operatively connected to one another to coordinate rotation of the first chopper drum and the second chopper drum and a timing-adjustment configuration in which the first timer portion and the second timer portion are operatively disconnected from one another allowing relative movement between the first timer portion and the second timer portion and corresponding relative rotation between the first chopper drum and the second chopper drum to adjust a timing of operation between the first blades and the second blades;
  a wear indicator that indicates an extent of blade wear of the chopper upon adjustment of the timing of operation via the timer in the timing-adjustment configuration; and
  wherein the wear indicator comprises a scale and a pointer that points at the scale.

15. The chopper system of claim 14, wherein the scale comprises a series of marks at regular intervals, the series of marks comprises a larger mark and a number of smaller marks on either side of the larger mark, the larger mark is indicative of a fresh-blade chopper configuration of the chopper in which the first and second blades are fresh, and the smaller marks are indicative of the extent of blade wear of the chopper relative to the fresh-blade chopper configuration.

* * * * *